United States Patent [19]
Fukamachi et al.

[11] Patent Number: 5,864,520
[45] Date of Patent: Jan. 26, 1999

[54] MAGNETO-OPTICAL RECORDING MEDIUM FOR MAGNETICALLY INDUCED SUPER RESOLUTION

[75] Inventors: Yuichi Fukamachi, Nara; Masahiro Birukawa, Hirakata, both of Japan

[73] Assignee: Matsushita Electric Industrial Co., Ltd., Osaka, Japan

[21] Appl. No.: 886,149

[22] Filed: Jun. 30, 1997

Related U.S. Application Data

[62] Division of Ser. No. 443,701, May 18, 1995, Pat. No. 5,706,259.

[30] Foreign Application Priority Data

May 18, 1994 [JP] Japan .................................. 6-103836

[51] Int. Cl.$^6$ .................................................. G11B 11/00
[52] U.S. Cl. ............................................. 369/13; 360/59
[58] Field of Search ........................... 369/13, 14, 275.2, 369/275.3; 360/59, 114; 428/694 ML, 694 MM; 365/122

[56] References Cited

U.S. PATENT DOCUMENTS

| | | | |
|---|---|---|---|
| 5,164,926 | 11/1992 | Matsumoto | 369/13 |
| 5,168,482 | 12/1992 | Aratani et al. | 369/13 |
| 5,210,724 | 5/1993 | Kobayashi | 369/13 |
| 5,218,581 | 6/1993 | Ohta et al. | 369/13 |
| 5,224,080 | 6/1993 | Ohtsuki | 369/13 |
| 5,241,520 | 8/1993 | Ohta et al. | 369/13 |
| 5,258,237 | 11/1993 | Nakaki et al. | 428/694 EC |
| 5,265,073 | 11/1993 | Osata | 369/13 |
| 5,278,810 | 1/1994 | Takahashi et al. | 369/13 |
| 5,309,427 | 5/1994 | Matsumoto | 369/275.2 |
| 5,488,604 | 1/1996 | Negishi | 369/275.2 |
| 5,706,259 | 1/1998 | Fukamachi et al. | 369/13 |

FOREIGN PATENT DOCUMENTS

| | | |
|---|---|---|
| 1-307940 | 12/1989 | Japan . |
| 6-150417 | 5/1994 | Japan . |

OTHER PUBLICATIONS

"Read Out Mechanism of Magnetically Induced Super Resolution", M. Ohta et al., (Proceedings of Magneto Optical Recording International Symposium 1991, J.Magn.Soc.Jpn., vol. 15, Supp. No. S1 ('91, pp. 319–322.

"Large–Capacity Magneto–Optical Disk System Using Magnetically Induced Super Resolution", S. Yoshimura et al., (IEEE Transactions on Consumer Elec., vol. 38, No. 3, Aug. 1992, pp. 660–664).

"High–Density Magneto–Optical Disk System Using Magnetically Induced Super Resolution", S. Yoshimura et al., International Symposium Optical Memory, pp. 43–44.

"Multi–Layered Magneto–Optical Disks for Magnetically Induced Super Resolution", M. Kaneko et al., International Symposium Optical Memory, pp. 35–36.

*Primary Examiner*—Ali Neyzari
*Attorney, Agent, or Firm*—Wenderoth, Lind & Ponack, L.L.P.

[57] ABSTRACT

In a magneto-optical recording medium for super resolution reproduction, a recording layer having a Curie temperature of 300° C. or higher is used. An inhibition force for inhibiting movement of a domain wall in the recording layer is enhanced, while the magnetization is sufficiently increased such that a contraction force, which decreases a surface area of the domain wall, can be decreased. Thus, recording domains become stable during recording and erasing. Further, cross erasing characteristics can be improved, while maintaining previously used recording and erasing powers. The inhibition force becomes larger than the contraction force, even if the Curie temperature is low, when the recording layer is made of a first magnetic material for forming recording domains which have a compensation temperature between 0° and 200° C., or when the compensation temperature of the recording layer is between 0° and 200° C.

5 Claims, 15 Drawing Sheets

MAGNETO-OPTICAL RECORDING MEDIUM FOR MAGNETICALLY INDUCED SUPER RESOLUTION

This is a Rule 60 divisional application of Ser. No. 08/443,701, filed May 18, 1995 now U.S. Pat. No. 5,706,259.

BACKGROUND OF THE INVENTION

1. Field of the Invention

The present invention relates to a magneto-optical recording medium such as a magneto-optical disk for writing and reproducing information with a laser beam or other similar devices.

2. Description of the Prior Art

The amount of data which must be dealt with in an information processing system is increasingly becoming larger, and a recording medium having a large storage capacity such as a magneto-optical recording medium has attracted attention. Magneto-optical recording is a type of vertical magnetic recording in which the direction of magnetization is vertical to a substrate plane, and upward and downward magnetization are assigned to signals of "0" and "1". Signals are recorded as domains which are heated above a Curie temperature to reverse the magnetization direction by an external field. The signals are reproduced by detecting the polarization of the laser beam reflected by the domains. According to the Kerr effect, a sign of a difference of the polarization between the incident and reflecting beams depends on the magnetization direction.

In order to increase the recording density of a magneto-optical recording medium, a super resolution technique is developed which can read signals even when a domain size is smaller than an optical resolution limit determined by a laser spot size (refer to U.S. Pat. No. 5,168,482). Thus even if two recording domains are included in a laser spot irradiated by the laser beam, information can be read.

The super resolution technique is divided into three types of detection: (a) Front aperture detection (FAD) where a recording domain is read from an area of lower temperature in a laser spot, (b) Rear aperture detection (RAD) where a recording domain is read from an area of higher temperature in a laser spot, and (c) Double aperture detection (DAD) which is a combination of FAD and RAD.

Magneto-optical recording media for super resolution has a structure different from an ordinary magneto-optical recording media. For example, a magneto-optical recording medium for front aperture detection comprises three magnetic layers, or specifically a recording layer, a switching layer and a readout layer. A magneto-optical recording medium for rear aperture detection comprises three magnetic layers, or specifically a recording layer, an intermediate layer and a readout layer. Information is recorded on the recording layer, and it is copied on to the readout layer during reproduction. Then, the signals are read by reading the direction of the magnetization in the readout layer.

The super resolution technique uses temperature distribution in a laser spot irradiated by the laser beam. However, the heat generated during erasing and recording causes a problem in that magnetic domains are affected by the heat generated. Even recording domains formed in a track adjacent to a particular track to be recorded or erased are likely affected by the heating. As the track pitch is made shorter in order to increase the recording density, this phenomenon is liable to occur more, especially in a land and groove recording where recording domains are formed along lands and grooves.

In a magneto-optical recording medium comprising layered magnetic layers, a half bubble may be generated in an adjacent track. In the half bubble, the magnetization in the readout layer is aligned along an applied external magnetic field, while the magnetization in the recording layer remains unchanged. In other words, a domain wall is also formed between the recording layer and the readout layer at the top of the half bubble. Because the above-mentioned domain wall also stores energy, the recording domain in the half bubble state may be more likely to vanish.

Further, if a magnetic field modulation for controlling the direction of applied magnetic field with a magnetic head is adopted for erasing and recording, a laser beam will continuously irradiate tracks. Therefore, the tracks are affected more by laser beam irradiation due to turning on or off the laser beam than the above-mentioned optical modulation for recording.

When the size of recording domains is decreased to obtain a higher recording density, the domains become easier to contract because a force for contracting a recording domain is inversely proportional to the size of recording domain. On the other hand, as a track pitch is shortened to obtain a higher recording density, the temperature of an adjacent track rises higher. Therefore, as the coercive force of the magnetic domain in the recording layer decreases with increasing temperature, an inhibition force for inhibiting movement of domain wall largely decreases, and magnetic domains become easier to contract.

SUMMARY OF THE INVENTION

An object of the present invention is to provide an magneto-optical recording medium wherein domains recorded in a track do not vanish when an adjacent track is erased or recorded.

A magneto-optical recording medium of the present invention comprises a recording layer, a switching layer and a readout layer for front aperture detection, while it comprises a recording layer, an intermediate layer and a readout layer for rear aperture detection. Recording domains are formed in the recording layer along tracks, for example along lands and grooves, while magnetic states of the recording domains are copied on to the readout layer from the recording layer during reproduction. The recording layer has an inhibition force to inhibit movement of a domain wall of the recording domain which is larger than a contraction force of a half bubble formed only in the recording layer when an adjacent track is heated during erasing or recording. Thus, the recording domains in a track becomes stable when an adjacent track is heated during erasing or recording.

For example, in one aspect of this invention the recording layer is made of a first magnetic material for forming recording domains, and the first magnetic material has a Curie point of 300° C. Thus, the inhibition force becomes larger than the contraction force. In a different aspect of this invention, the recording layer is made of a first magnetic material for forming recording domains, and the first magnetic material has a compensation temperature between 0° and 200° C. Then, the inhibition force becomes larger than the contraction force even if the Curie point is low. In a fourth aspect of this invention, the compensation temperature of the recording layer is between 0° and 200° C. Then, the inhibition force becomes larger than the contraction force even if the Curie point is low.

Preferably, a temperature range wherein a coercive force of the recording layer is 20 kOe or higher and is 30° C. or more higher than a compensation temperature of the recording layer. Preferably, a coercive force of the recording layer is 3 kOe or higher at room temperature and the coercive force thereof is 500 Oe or lower and is between 200° and 250° C.

An advantage of the magneto-optical recording medium of the present invention is that the recording domains are stabilized during erasing and recording.

BRIEF DESCRIPTION OF THE DRAWINGS

These and other objects and features of the present invention will become clear from the following description taken in conjunction with the preferred embodiments and with reference to the accompanying drawings in which.

DETAILED DESCRIPTION OF THE PREFERRED EMBODIMENTS

Figure 1:
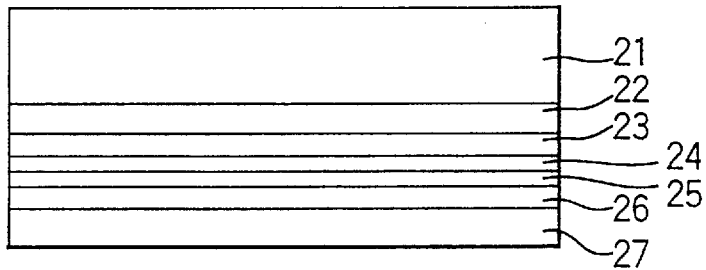
FIG. 1 is a sectional view of a magneto-optical recording medium for front aperture detection.
Figure 2:
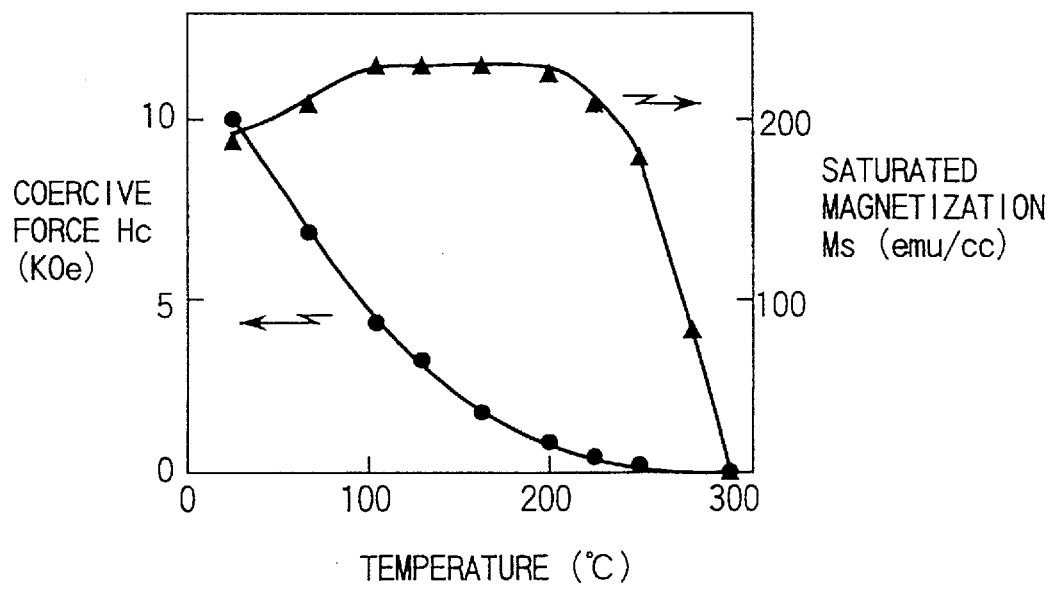
FIG. 2 is a diagram of the temperature dependence of coercive force $H_c$ and the saturated magnetization $M_s$ of TbFeCo of the recording layer.

Referring now to the drawings, wherein like reference characters designate like or corresponding parts throughout the several views, embodiments of the invention are explained below. FIG. 1 shows a magneto-optical disk for front aperture detection. A first silicon nitride (SiN) layer 22, a readout layer 23 made of GdFeCo, a switching layer 24 made of TbFe, a recording layer 25 made of TbFeCo, a second silicon nitride layer 26 and an overcoat layer 27 are formed successively on a polycarbonate (PC) substrate 21. GdFeCo, TbFe and TbFeCo are all magnets at room temperature, they all include rare earth metals, and their Curie temperatures are 300°, 130° and 300° C. respectively. The track pitch of the magneto-optical disk is 0.8 $\mu$m, and recording domains are formed along lands and grooves of track guide grooves. FIG. 2 shows temperature dependence of a coercive force $H_c$ and a saturated magnetization $M_s$ of TbFeCo of the recording layer 25.

Figure 3:
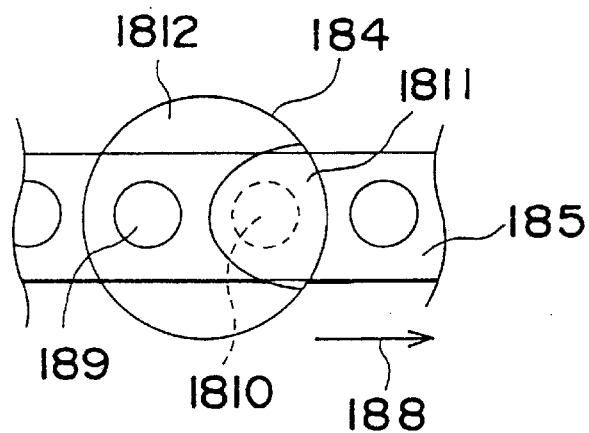
FIG. 3 is a schematic perspective view for showing front aperture detection.
Figure 4:
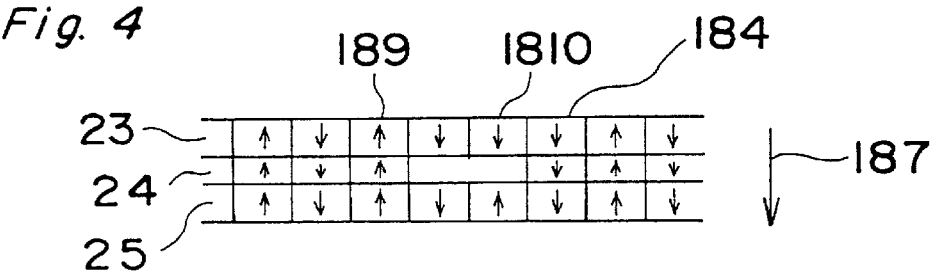
FIG. 4 is a diagram of magnetic states of recording domains along a vertical direction.

Front aperture detection is explained below. FIG. 3 shows recorded domains 189 formed along a track 185, and FIG. 4 shows magnetization directions of the magnetic domains 189 along a vertical direction. The readout layer 23, the switching layer 24 and the recording layer 25 are all alloys of rare earth and transition metals at room temperature, and they are coupled by exchange coupling forces. Then, though the readout layer 23 has a weak coercive force $H_c$ of about 50 Oe, the recording domains 189 exist in a stable condition. An area 184 irradiated by a laser beam has a temperature distribution, and it has an asymmetric temperature distribution when the disk is rotated along a direction 188 for reproduction. The area 184 irradiated by a laser beam is larger than a distance between two recording domains 189. In a part 1811 adjacent to an area already irradiated, the temperature is higher than the Curie temperature of the switching layer 24, and the exchange coupling force between the recording layer 25 and the readout layer 23 is blocked. Then, as shown in FIG. 4, the magnetization of a recording domain 1810 in the readout layer 23 aligns along the external magnetic field 187, while that of the recording layer 25 is kept the same. Then, only one recording domain 189 in the area 1812 can be reproduced by adjusting the intensity of laser power, adjusting the amplitude of magnetic field for reproduction, and adjusting the size of the part 1811.

Figure 5:
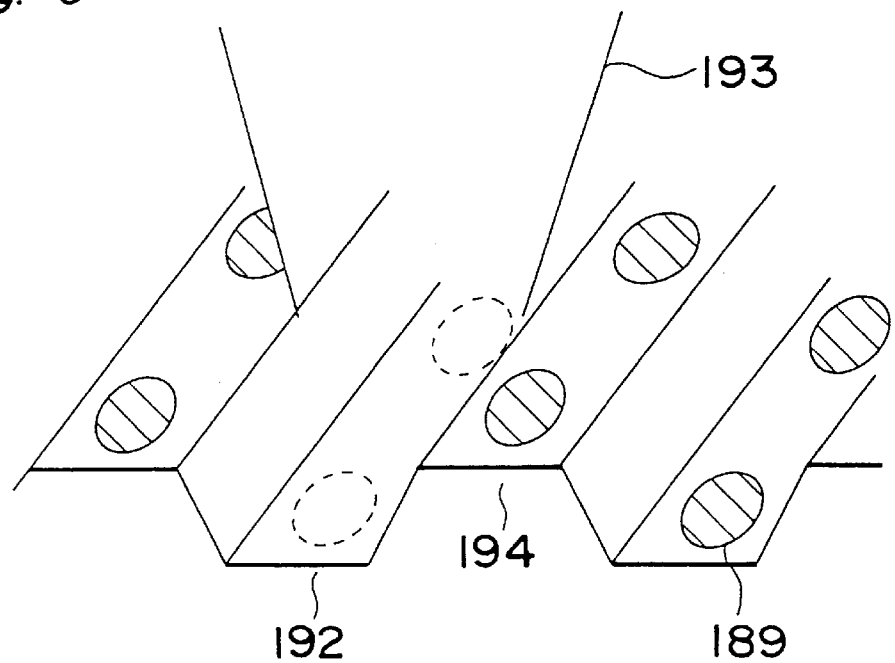
FIG. 5 is a schematic view for showing a cross erasing test.

FIG. 5 shows a method of cross erasing on the magneto-optical disk. Cross erasing denotes a phenomenon that occurs when a particular track is erased after signals are recorded and an adjacent track is also erased. Cross erasing is checked as follows. First, recording is carried out to form recording domains 189 along tracks 192, 194. Then, the track 192 to be erased is irradiated by a laser beam 193 to erase recording domains 192 as shown by dashed circles. Then, signals in the track 194 adjacent to the track 192 is reproduced, and a difference of output signals before and after erasing is obtained.

Figure 6:
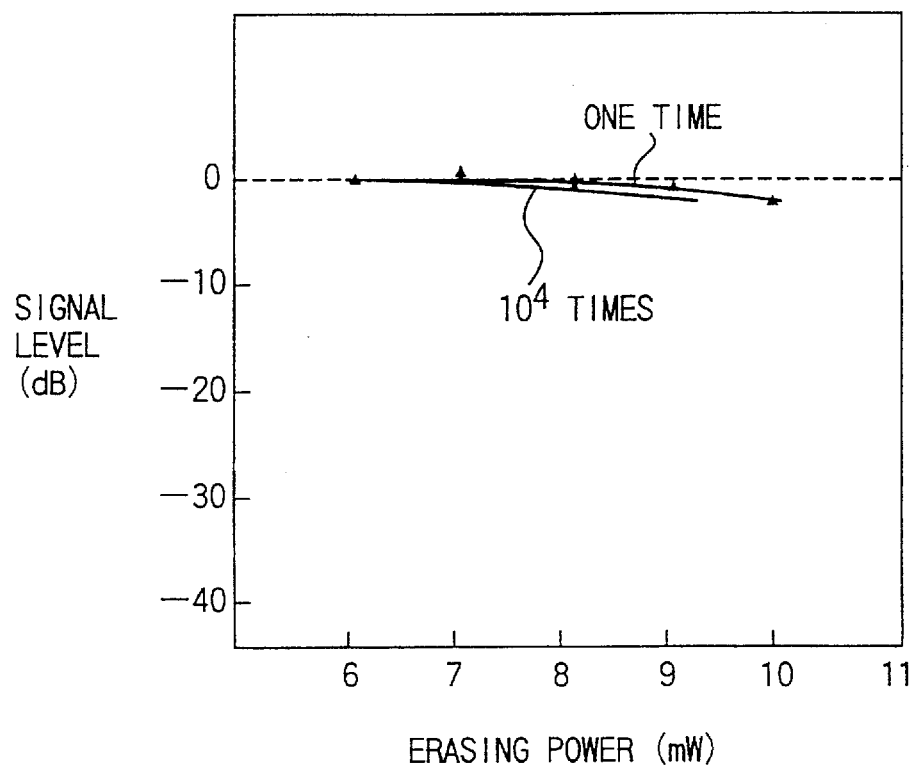
FIG. 6 is a graph of a difference of output signals plotted against an erasing power of a cross erasing test for the erasing of one time and $10^4$ times.

FIG. 6 shows a result of an example of a cross erasing test. The conditions of the cross erasing test is as follows: The track pitch is 0.8 $\mu$m, and the diameter of recording domain is 0.4 $\mu$m. The duty of the pulse width of the laser beam is 38%, and the linear velocity thereof is 6 m/s. The wavelength of the laser beam is 830 nm. The numerical aperture is 0.5. An adjacent track is erased one time and $10^4$ times. A decrease in the signal output of the adjacent track due to cross erasing is only about 2 dB even if the erasing power of laser beam as large as 9 mW is used.

Figure 7:
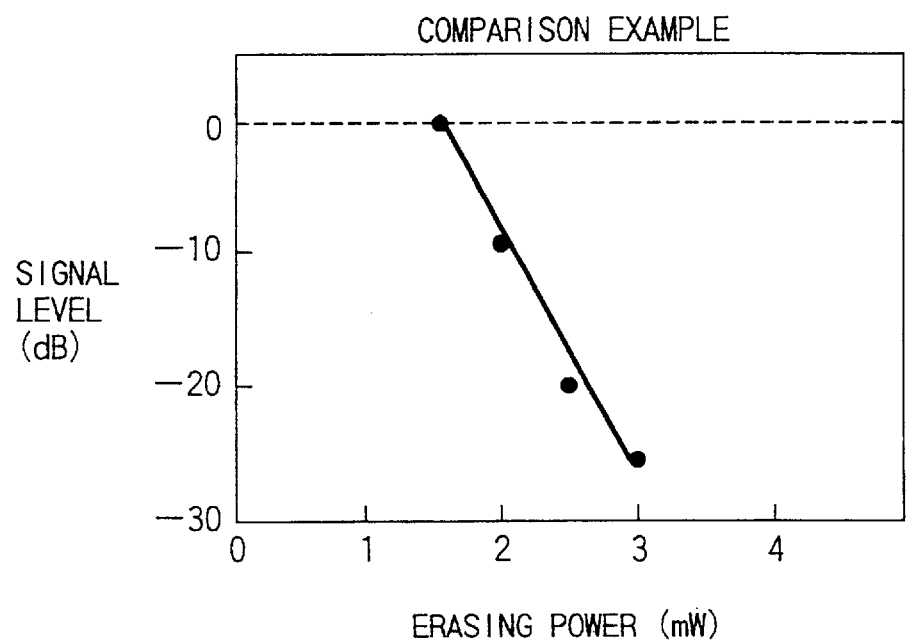
FIG. 7 is a graph of a first comparison example of a difference of output signals plotted against an erasing power of a cross erasing test for the erasing of one time.

FIG. 7 shows a difference of output signals plotted against the erasing power of a first comparison example. The magneto-optical disk is the same as that shown in FIG. 1 except that a recording layer has a Curie temperature of 230° C. Erasing is carried out one time. The conditions of recording and reproduction are the same as those of the above-mentioned test. As shown in FIG. 7, the output signal decreases by about 25 dB for an erasing power of 3 mW.

Figure 8A:
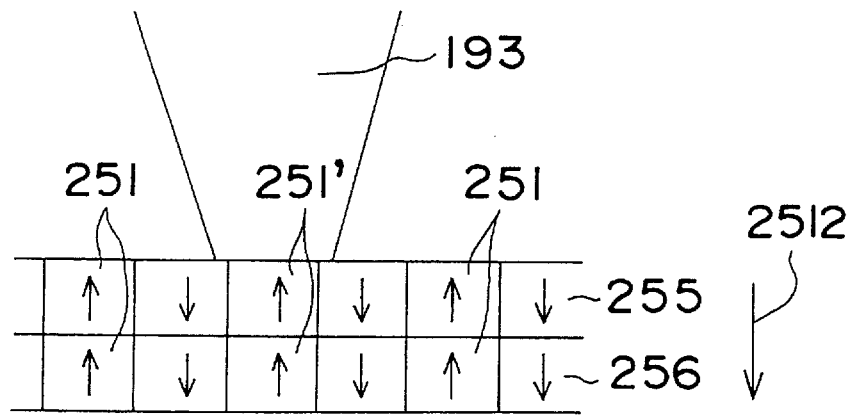
FIG. 8A is a diagram of states of magnetization in recording domains before erasing.
Figure 8B:
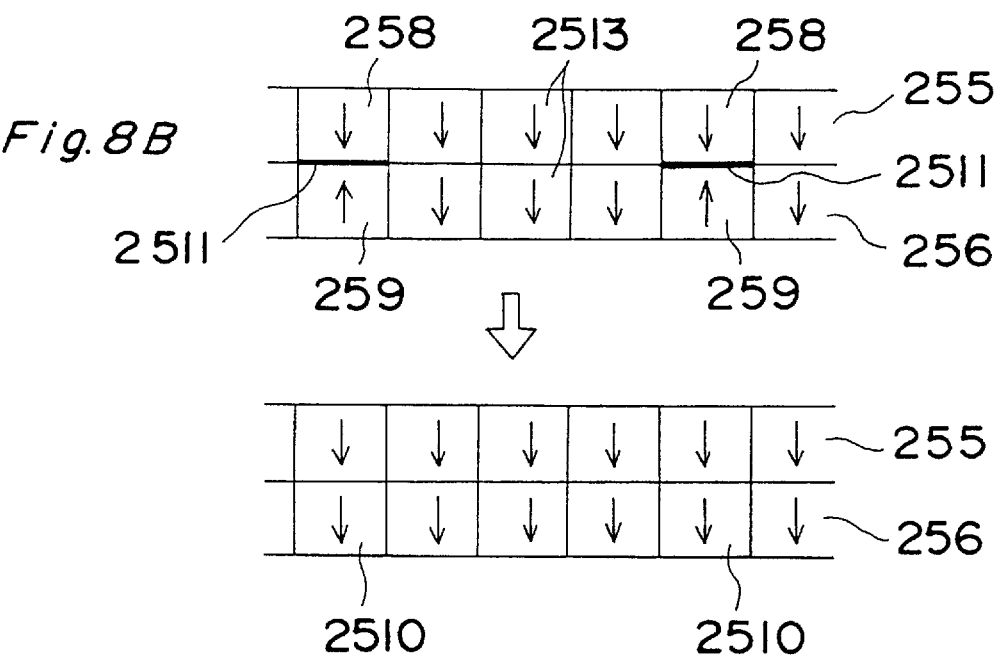
FIG. 8B is a diagram showing the states of magnetization in the recording domains in the upper part after erasing and in the lower part after contraction.

Before explaining further the improvement of cross erasing characteristic of an embodiment of the present invention, a mechanism for decreasing the signal level during cross erasing is illustrated in the magneto-optical disk of the first comparison example in land the groove recording. FIGS. 8A and 8B show schematically the directions of magnetization along the vertical direction of a readout layer 255 and a recording layer 256 of the example on recording domains, the magnetization directions being perpendicular to the tracks. FIG. 8A shows an example of magnetization states of the recording domains before erasing, wherein upward and downward directions are changed alternately in the two layers 255, 256. The recording domain 251' shown at the center of the recording domains in FIG. 8A correspond to a track which is to be erased by a laser beam 193. During erasing of the recording domain 251', the laser beam 193 scans the track under a magnetic field 2512, and as shown in FIG. 8B, the direction of magnetization of the recording domains 251' comprising subdomains 2513 becomes downward along the direction of the external magnetic field 2512. When a track is erased, the temperature rises in the recording domains 251 of tracks which are adjacent to the erasing track. Then, the exchange coupled force between the recording layer 256 and the readout layer 255, and the coercive force of the subdomains 258 become weaker, and the direction of regions of the subdomains 258 in the readout layer 255 aligns along the direction of the magnetic field 2512. Then, it is observed that the recording domains 251 in adjacent tracks contract to recording domains 259 of a smaller size, and domain walls 2511 are generated between the recording domain 259 in the recording layer 256 and the region 258 in the readout layer 255. The recording domain 259 in the recording layer 256 is called a half bubble. When the temperature in the adjacent tracks rises, the exchange coupling force between the reproduction and recording layers 255, 256 decreases with increasing temperature. On the other hand, the domain wall 2511 between the two subdomains 258 and 259 also stores energy, and this domain wall 2511 tends to contract a recording domain. Then, as shown in the lower part in FIG. 8B, the half bubbles 259 in the adjacent tracks vanish as shown by the regions denoted by reference numeral 2510.

In the disk of the embodiment in the present invention, the coercive force of the recording layer 25 is 10 kOe at room temperature. The coercive force needs to be 3 kOe or higher at room temperature in order to keep recording domains stable against initialization magnetic fields because the initialization magnetic field of 3 kOe is applied in both rear and double aperture detections (DAD).

Force applied to magnetic domains comprise a contraction force, an inhibition force and an expansion force. The expansion force is generated by a diamagnetic field which is due to surface magnetic charges, and it is proportional to the saturated magnetization. The expansion force tends to increase a surface area of the domain wall. However, because the expansion force is much smaller than the other two forces, it can be neglected. A magnetic domain has a cylindrical domain wall at the side and the contraction force tends to decrease a surface area of the domain wall. The contraction force becomes stronger with decreasing domain size. The inhibition force inhibits removal of domain walls or it acts to retain magnetization, and it comprises a coercive force $H_c$ and an exchange coupling force $H_{exc}$ which does not exist in prior art magneto-optical disks which have a single ferrimagnetic layer. The coercive force $H_c$ is a significant factor because it is large in a magneto-optical disk. The exchange coupling force $H_{exc}$ creates magnetization which aligns in the same direction as in a ferrimagnet. In the magneto-optical disk, in which both the reproduction and recording layers consist of ferrimagnets, magnetization of the two layers align along the same direction. An external magnetic field acts as a contraction force or as an expansion force according to the direction of the field.

As described above, the expansion force can be neglected in this case. Then, if the absolute value of the contraction force is smaller than the inhibition force, domain walls do not move, and recording domains remain stable. On the other hand, if an absolute value of the contraction force is larger than the inhibition force, domain walls move, and recording domains contract or expand and become unstable.

In front aperture detection of the disk, the inhibition force of recording domains after recording is $H_{c1}+H_{exc1}$, where $H_{c1}$ denotes the coercive force of the recording layer and $H_{exc1}$ denotes the exchange coupling force acting between the recording and the readout layers via the switching layer. They are expressed as values converted to magnetic field. A sum of the coercive force $H_{c2}$ and the exchange coupling force $H_{exc1}$ is represented as a switching magnetic field $H_{sw}$. If an external magnetic field larger than $H_{sw}$ is applied, the magnetization of the readout layer aligns along the external magnetic field.

The three forces mentioned above, namely, the contraction force, the inhibition force and the expansion force, are calculated for the disk of the present embodiment. A particular recording domain 189 which exists in a track 194 adjacent to a track 192 to be erased is considered here in detail. The temperature of the recording domain 194 also rises due to the heat generated during the erasing of the track 192. FIG. 2 shows the temperature dependence of the coercive force $H_c$ of the recording layer of TbFeCo having a Curie point of 300° C. At 120° C., the coercive force is 2.9 kOe. The exchange coupling force increases by about 1.15 times due to an increase in the Curie point. The exchange coupling force decreases by about 0.5 times due to an increase in the magnetization, or it is about 0.6 times greater than the force for the recording layer of the comparison example having a Curie point of 230° C., or about 300 Oe. Then, the inhibition force for inhibiting movement of the domain wall is 2.9−0.3=2.6 kOe.

Figure 9:
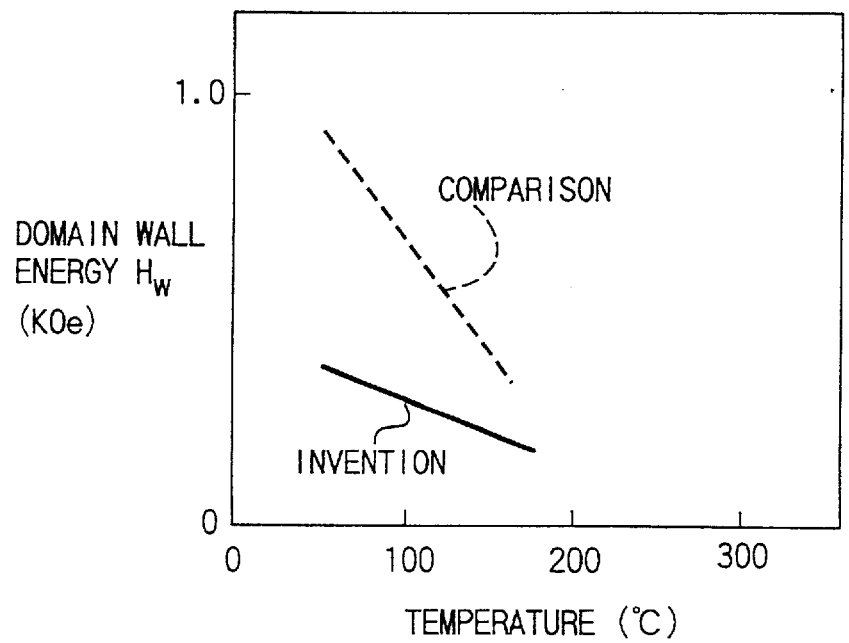
FIG. 9 is a graph of a domain wall energy plotted against temperature.

On the other hand, the contraction force is a sum of the erasion magnetic field $H_{erase}$ and the force $H_w$ which is due to a domain wall of the recording domain 189. FIG. 9 shows the force $H_w$ which is due to domain wall. Because the magnetization is high, $H_w$ is about 300 Oe at 120° C. which is half or less of the force of the comparison example recording layer. Then, if the erasing magnetic field is set at 500 Oe, the contraction force is 800 Oe. Therefore, the inhibition force is larger than the contraction force by 1.8 kOe, and a recording domain can be kept stable.

Figure 10:
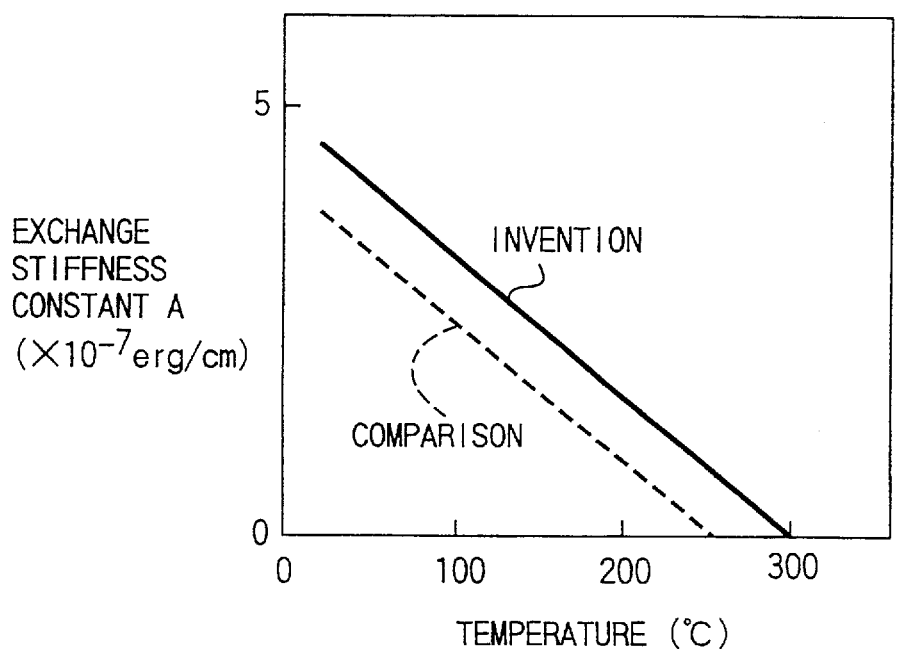
FIG. 10 is a graph of the temperature dependence of the exchange stiffness constant A of an embodiment of a disk and a comparison example.
Figure 11:
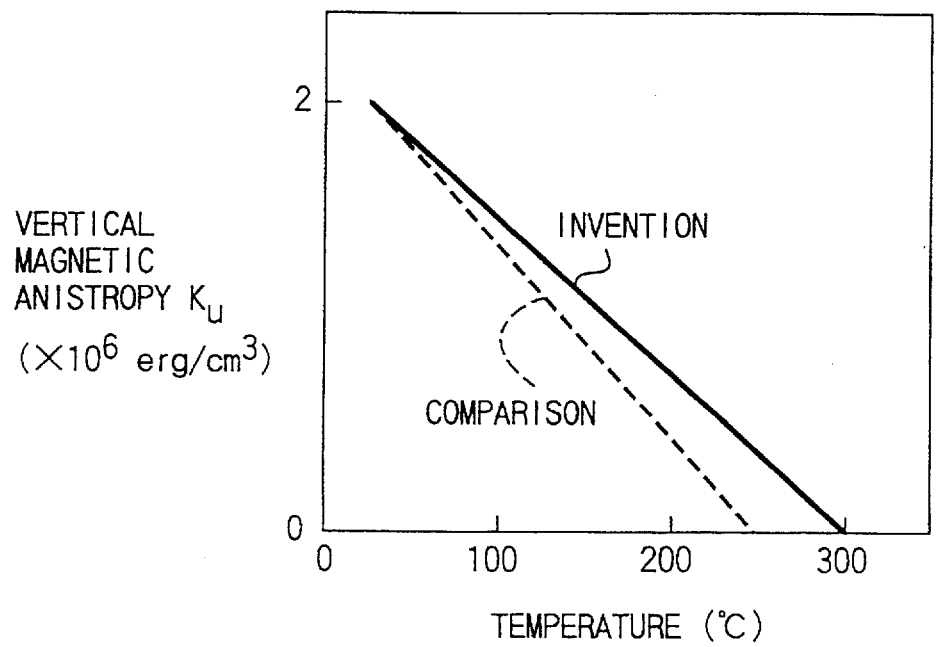
FIG. 11 is a graph of the temperature dependence of the vertical magnetic anisotropy $K_u$ of an embodiment of a disk and a comparison example.
Figure 12:
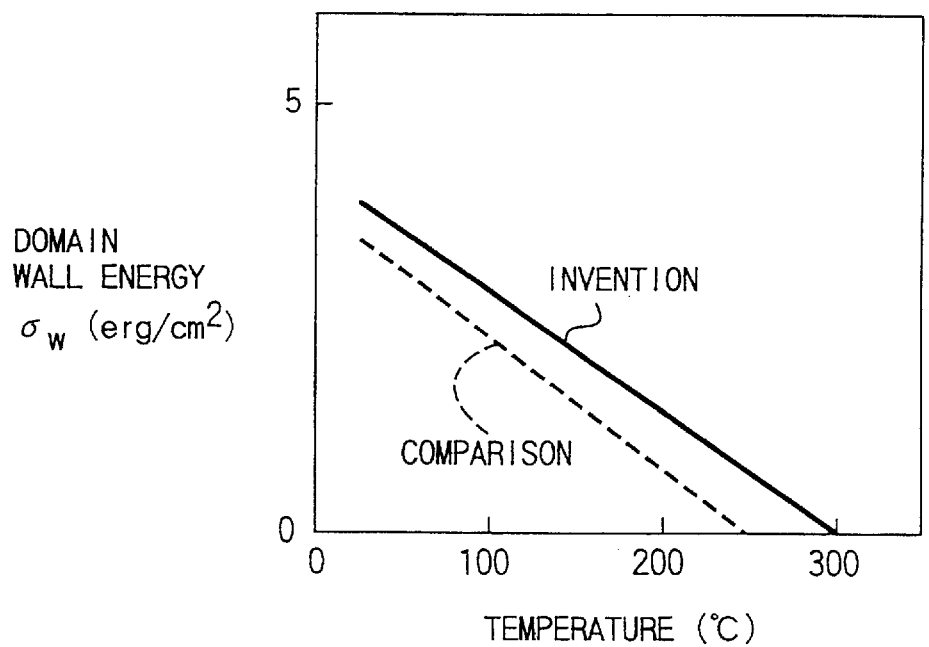
FIG. 12 is a graph of the temperature dependence of the domain wall energy $\sigma_w$ of an embodiment of a disk and the comparison example.

The force $H_w$ due to the domain walls as shown in FIG. 9 is calculated by using a stiffness constant A and a vertical magnetic anisotropy constant $K_u$. FIGS. 10 and 11 show the temperature dependence of A and $K_u$ of the embodiment and the comparison example. Values stated in the Journal of Applied Physics 64(7), 1 (1988) are used, but it is assumed that A and $K_u$ decrease linearly with temperature and that $K_u$, at room temperature of the recording layer 25, is the same as that of the prior art. The domain wall energy $\sigma_w=4*(A*K_u)^{1/2}$ is obtained from the data of FIGS. 10 and 11, and the inhibition force $H_w$ for inhibiting movement of the domain wall is calculated as $H_w=\sigma_w/(2*r*M_s)$. FIG. 12 shows temperature dependence of the domain wall energy $\sigma_w$, wherein a radius r of recording domain is assumed to be 0.2 μm and the saturated magnetization $M_{s1}$ used is a measured value as shown in FIG. 2.

Figure 13:
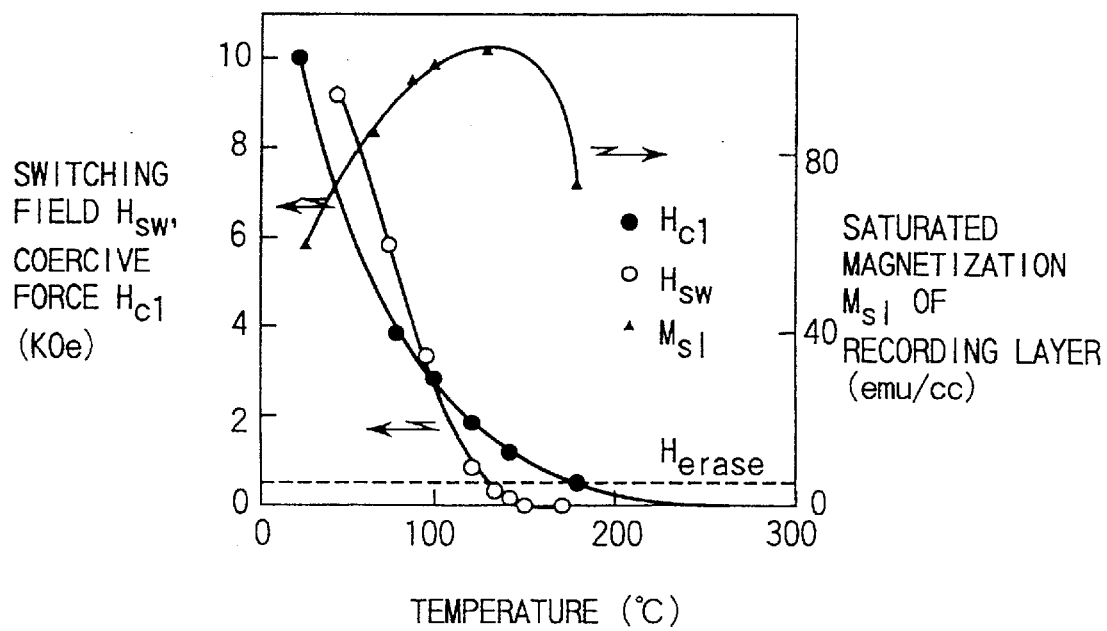
FIG. 13 is a graph of the temperature dependence of the coercive force $H_{c1}$, the saturated magnetization $M_{s1}$ of the comparison example and the exchange coupling force $H_{sw}$.

The three forces mentioned above, namely, the contraction force, the inhibition force and the expansion force, are also calculated for the disk of the prior art. FIG. 13 shows the temperature dependence of the coercive force $H_{c1}$ and the saturated magnetization $M_{s1}$ of the recording layer of the comparison example, and the switching field $H_{sw}$. A particular recording domain 189 in a track 194 which is adjacent to a track 192 to be erased is considered here. The temperature of the recording domain 194 also rises due to the heat generated during the erasing of the track 192. When an erasing magnetic field $H_{erase}$ of 500 Oe is applied, the switching magnetic field $H_{sw}$ is smaller than 500 Oe at a temperature of 120° C. or higher, and the magnetization of the recording domain in the readout layer aligns along the direction of the external magnetic field for erasion. At this time, referring to FIG. 13, the inhibition force of the recording domain in the recording layer 25 is $H_{c1}-H_{exc1}$ or about 1 kOe. It is assumed here that $H_{exc1}=H_{sw}$ because the coercive force in the readout layer is as small as 50 Oe. On the other hand, the contraction force is a sum of the erasion magnetic field $H_{erase}$ and the force $H_w$ which is due to a domain wall of the recording domain 189. The exchange coupling force $H_w$ is about 600 Oe at a temperature of 120° C. according to FIG. 9, and $H_{erase}+H_w=1.1$ kOe. Then, the contraction force is larger than the inhibition force, and a recording domain vanishes.

In the embodiment, because recording and erasing are performed by increasing the temperature of the recording layer 25 of TbFeCo above a Curie temperature, a recording or erasing power which is larger than that of the first comparison example is needed. The Curie point of the example is 1.3 times or more higher that of the first comparison example. However, as shown in FIGS. 2 and 13, the coercive force of the recording layer 25 decreases rapidly at a temperature of 200° C. or higher and it becomes generally equal to the force of the comparison example at a temperature of 200° C. Therefore, the power used for recording in this embodiment is the same as that of the first comparison example.

Recording and erasing magnetic fields are usually set at 500 Oe or lower. Therefore, if the coercive force is less than the recording and erasing magnetic fields, recording and erasing can be performed with the same power as the comparison example in a temperature range between 200° and 250° C.

The coercive force of the recording layer of the example is 10 kOe. However, because the initialization magnetic field is set at 3 kOe, the coercive force is required to have a value above the initialization magnetic field.

If the recording layer 25 of TbFeCo having a coercive force of 3 kOe at room temperature and a Curie temperature of 300° C. is used, the force $H_w$ due to the magnetic domain increases further than the coercive force of the recording layer 25 of 10 kOe at room temperature because magnetization is inversely proportional to coercive force, and the force $H_w$ becomes about 100 Oe at 120° C. If the erasing magnetic filed is 500 Oe, the contraction force is 600 Oe. Because the coercive force at a temperature of 120° C. is about 1.5 kOe, the inhibition force for inhibiting movement of a domain wall is about 1.2 kOe. Then, the inhibition force is larger than the contraction force, thus making the recording domain stable.

Figure 14:
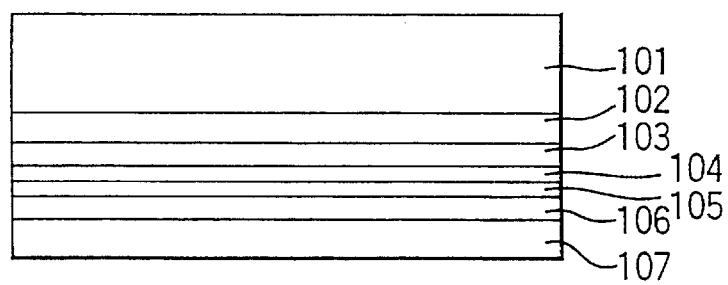
FIG. 14 is a sectional view of a magneto-optical recording medium for rear aperture detection.

FIG. 14 shows a magneto-optical disk for rear aperture detection of a second embodiment of the present invention. A first silicon nitride (SiN) layer 102, a readout layer 103 made of GdTbFeCo, an intermediate layer 104 made of GdFeCo, a recording layer 105 made of TbFeCo, a second silicon nitride layer 106 and an overcoat layer 107 are formed successively on a polycarbonate (PC) substrate 101. GdTbFeCo, GdFeCo and TbFeCo are all magnets having rare earth metal, and their Curie points are 300°, 200° and 300° C., respectively. The intermediate layer 104 can be magnetized along a plane at room temperature. Recording domains are formed along lands and grooves of track guide grooves.

Figure 15:
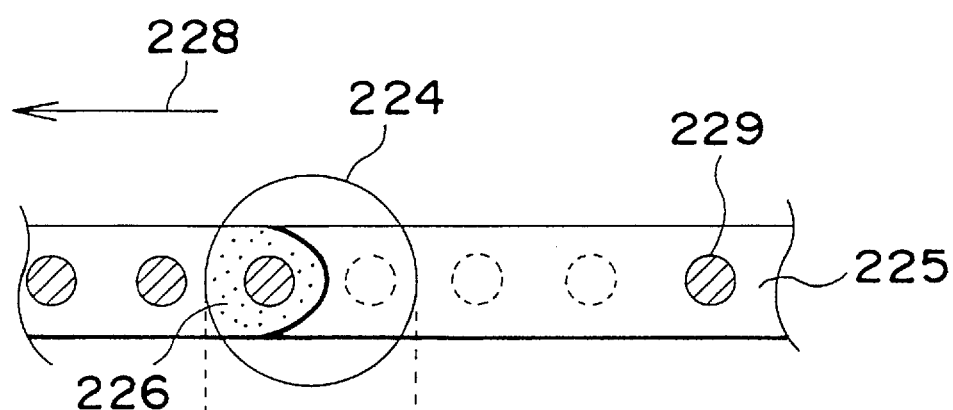
FIG. 15 is a schematic perspective view for showing front aperture detection.
Figure 16:
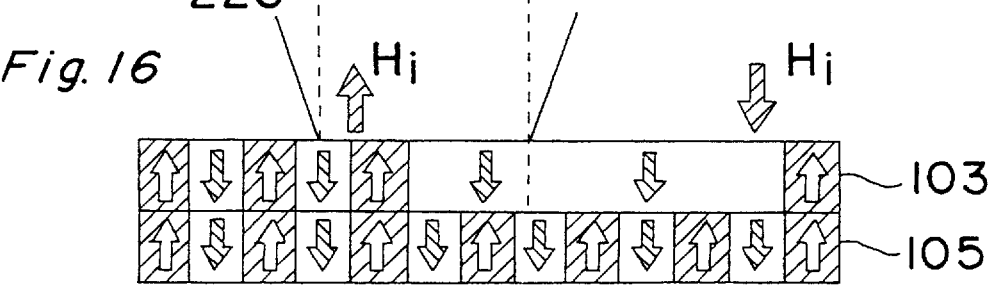
FIG. 16 is a diagram of the magnetic states of recording domains along a vertical direction.

Rear aperture detection is explained with reference to FIGS. 15 and 16. FIG. 16 shows the direction of magnetization of the recording domains along a vertical direction. Recording domains 229 are formed along a track 225. After the disk is initialized, it is recorded to form recording domains 229. Then, the readout layer 103 is magnetized along an erasing direction by applying an initialization magnetic field $H_i$. Information is held in the recording layer 105. The exchange coupling force between the readout layer 103 and the recording layer 105 is controlled by the intermediate layer 104. If a magnetic filed is larger than a sum of the coercive force $H_c$ of the readout layer 103 and an exchange coupling force, the initialization can be performed.

When the disk is rotated along a direction 228 for reproduction, an area 224 irradiated by a laser beam is larger than a distance between recording domains 229. The area 224 has an asymmetric temperature distribution when the disk is rotated along the direction 228 for reproduction. In a part 226 adjacent to an area already irradiated, the temperature is sufficiently high such that the coercive force $H_c$ becomes smaller than the exchange coupling force. Then, the information of the recording domain in the area 226 is copied from the recording layer 105 onto the readout layer 103, and the information can be reproduced.

Figure 17:
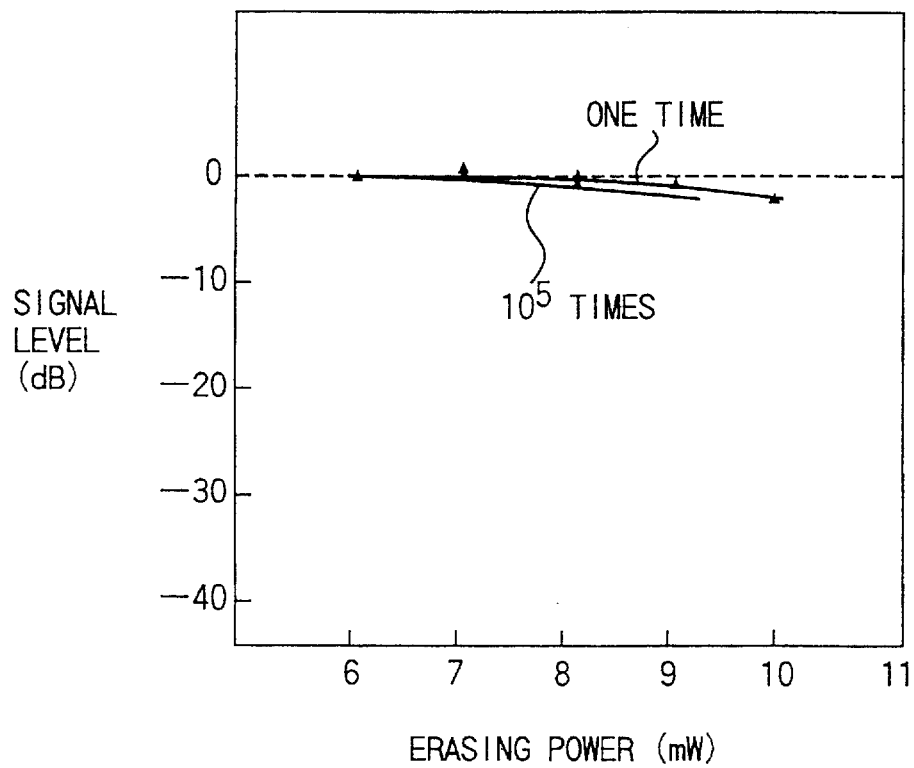
FIG. 17 is a graph of a difference of output signals plotted against an erasing power of a cross erasing test for the erasing of one time and $10^4$ time.

FIG. 17 shows the result of cross erasing on the magneto-optical disk for rear aperture detection as shown in FIG. 14. The track pitch is 0.8 μm. A decrease in the signal output of the adjacent track due to cross erasing is only about 2 dB even if an erasing power for the laser beam as large as 9 mW is used.

Figure 18:
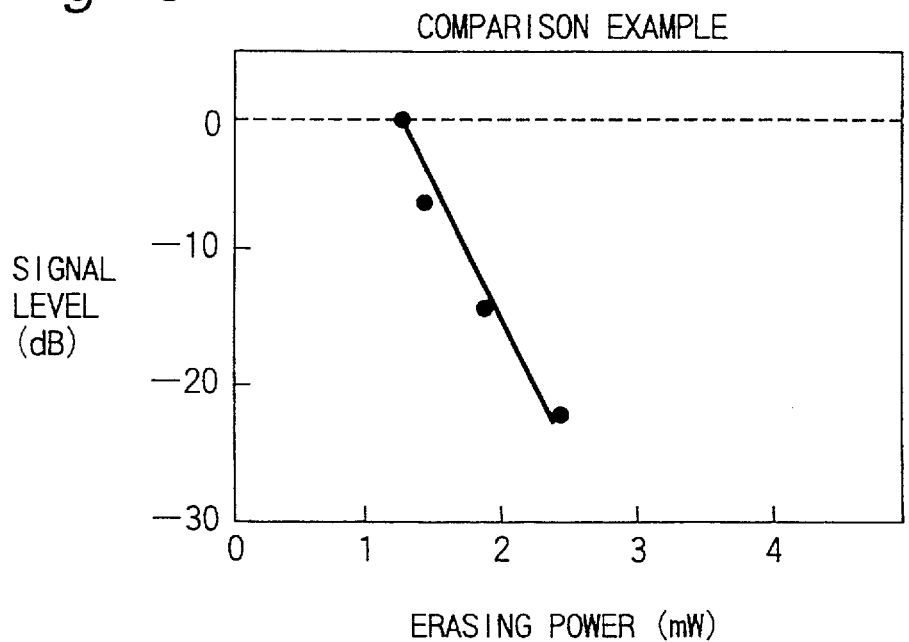
FIG. 18 is a graph of a difference of output signals plotted against an erasing power of a cross erasing test for the erasing of one time and $10^4$ times of a second comparison example.

On the other hand, FIG. 18 shows an example of cross erasing of the disk of a second comparison example. The magneto-optical disk is the same as that shown in FIG. 14 except that the recording layer has a Curie temperature of 230° C. Erasing is carried out one time. The conditions of recording and reproduction are the same as those of the above-mentioned test. As shown in FIG. 18, the output signal decreases by about 25 dB for an erasing power of 2.5 mW.

Figure 19:
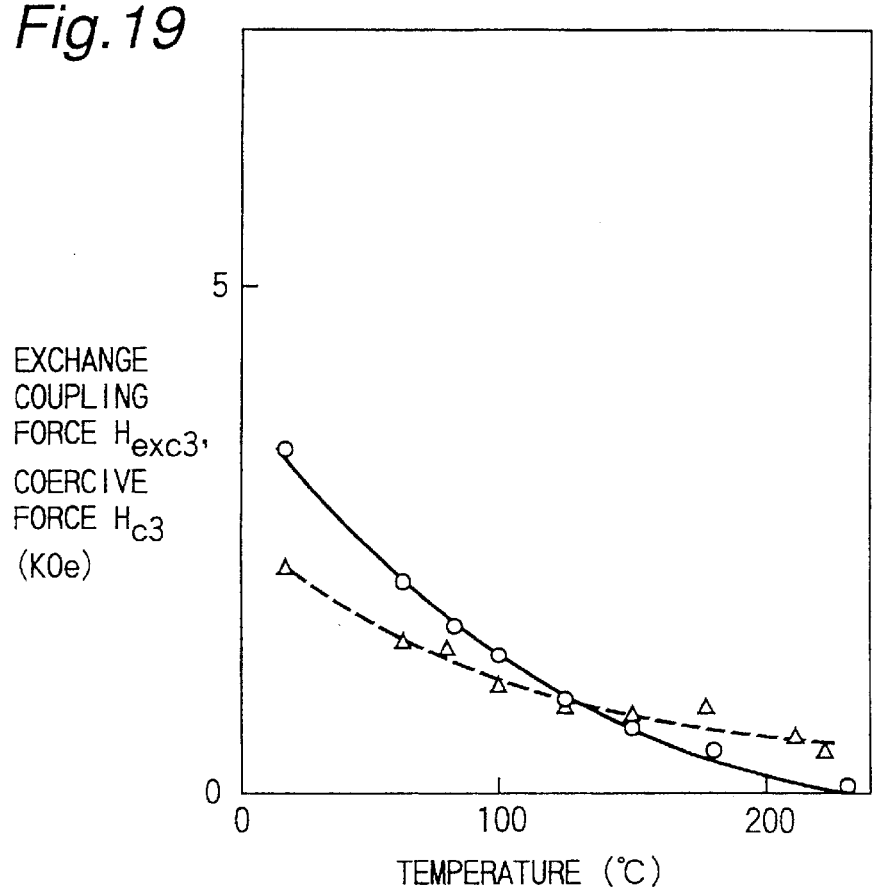
FIG. 19 is a graph of the temperature dependence of an exchange coupling force $H_{exc3}$ exerted between the reproduction and recording layers and a coercive force $H_{c3}$ of the readout layer of GdTbFeCo.

The contraction force and the inhibition force for inhibiting movement of domain walls are estimated similarly to that of the front aperture detection. FIG. 19 shows the temperature dependence of an exchange coupling force $H_{exc3}$ which exists between the recording 105 and readout layers 103, and the coercive force $H_{c3}$ of the readout layer 103 of GdTbFeCo. The recording layer 105 is made of TbFeCo.

In a range of $H_{c3} > H_{exc3}$, the exchange coupling force $H_{exc3}$ tends to decrease the inhibition force for inhibiting movement of domain wall. For example, the force is 3.5 kOe at a temperature of 100° C. (That is, if the coercive force is 4.2 kOe as shown in FIG. 2 while the exchange coupling force is 0.7 kOe as shown in FIG. 19, the magnetization of the recording layer 105 and the Curie point increase.) The contraction force is 800 Oe for the recording layer. (That is, a force due to domain walls $H_w$ is 300 Oe, and the erasing magnetic field is set to be 500 Oe.) The force due to domain walls $H_w$ is estimated from FIG. 9. Then, in the recording layer 105 of the embodiment, the contraction force is smaller than the inhibition force, such that the recording domain are kept stable.

On the other hand, the inhibition force is 1.0 kOe for the second comparison example. (That is, the coercive force is 2.2 kOe while the exchange coupling force is 1.2 kOe as shown in FIG. 13.) The contraction force is 1.1 kOe for the recording layer. (That is, a force due to domain walls $H_w$ is 600 Oe, and the erasing magnetic field is 500 Oe.) Therefore, a recording domain vanishes. Then, the contraction force is larger than the inhibition force, such that the recording domain vanishes.

Because double aperture detection (DAD) is a combination of front and rear aperture detections, the recording layer of TbFeCo used in the above-mentioned embodiment to improve the cross erasing characteristics of a magneto-optical disk for DAD. The disk for DAD comprises a readout layer, a switching layer, an intermediate layer and the recording layer, all of which are layered successively. The readout layer has a Curie temperature of 300° C. or higher and a coercive force of 1 kOe or lower which is similar to RAD and FAD. The switching layer has a Curie temperature of 200° C. or lower and a coercive force of 10 kOe or lower as in FAD, and the intermediate layer can be magnetized along a plane at room temperature as in RAD.

Further, although erasing is explained above, the temperature of an adjacent track rises due to the heat generated during recording, and the inhibition force decreases during recording. Then, by using the magneto-optical disk of the present invention, recording domains can be kept stable during recording.

When magnetic field modulation is adopted, the disk of this invention is especially preferable, because an adjacent track is affected more by the continuous irradiation of laser beam during magnetic field modulation.

Figure 20:
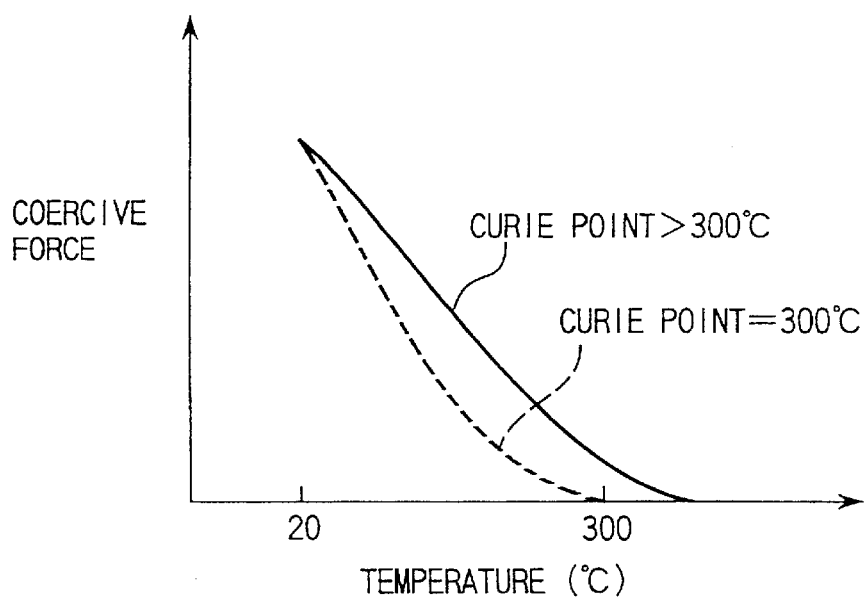
FIG. 20 is a graph of the temperature dependence of a coercive force.

The Curie temperature of the recording layer 105 is 300° C. However, it may be higher than 300° C. If the Curie temperature increases, magnetization also increases, such that the inhibition force $H_w$ for inhibiting movement of the domain wall decreases. Further, the coercive force decreases more gradually as shown in FIG. 20. Thus, recording domains become more stable.

As explained above, in the above-mentioned magneto-optical disks, the Curie temperature of the recording layer is selected to be 300° C. or higher. Then, when a track is heated during erasing or recording, the decrease in the coercive force can be suppressed for recording domains in an adjacent track of though the temperature of the track also rises. Further, by increasing magnetization by two times or higher than that of the comparison examples, the force H which is due to domain wall can be decreased to about a half of that of the comparison cases. Therefore, the contraction force of the recording domain becomes smaller than the inhibition force, such that recording domains can be kept stable. Further, by setting the coercive force of the recording layer at 500 Oe or lower in a temperature range between 200° and 250° C., recording and erasing can be performed with a power similar to that of the comparison cases.

A magneto-optical disk of a third embodiment has the same structure shown in FIG. 1 except that the recording layer is made of TbFeCo having a Curie temperature of 230° C. and a compensation temperature $T_{comp}$ of 120° C. The track pitch is 0.8 μm, and recording domains are formed along lands and grooves of the track guide grooves.

Figure 21:
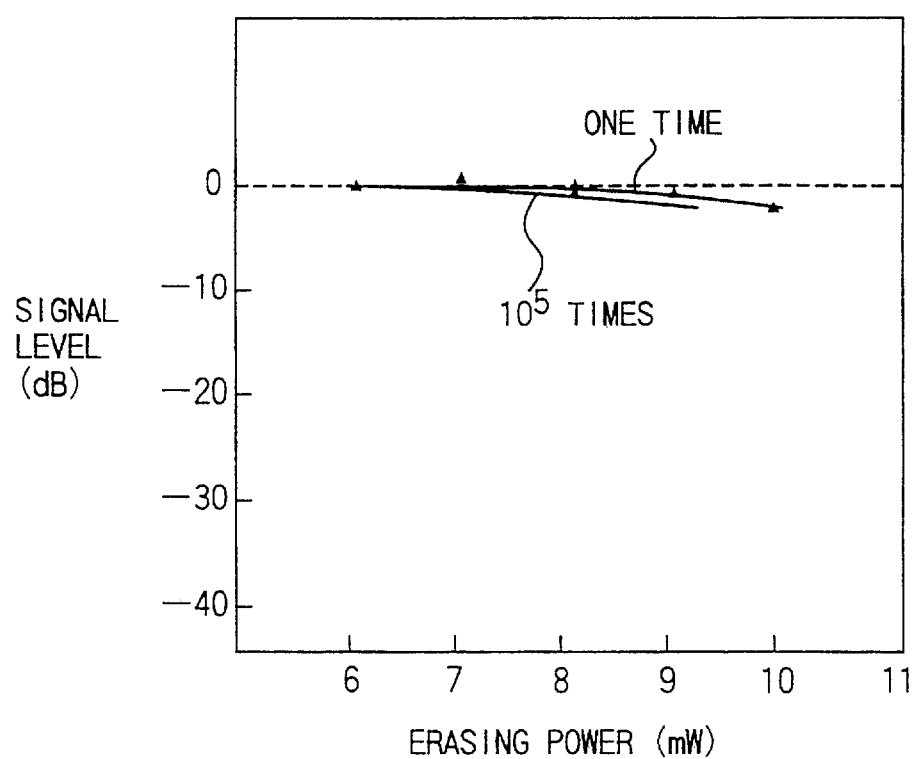
FIG. 21 is a graph of a difference of output signals plotted against the erasing power of a cross erasing test of a third embodiment of a disk.

FIG. 21 shows the cross erasing characteristic of the disk, and it is found that the cross erasing characteristic is largely improved over the characteristics of the first comparison example. This is a result of making the coercive force of the recording layer as high as about 20 kOe, and the coercive force in turn increases the inhibition force for inhibiting movement of the domain wall on cross erasing.

In a magneto-optical disk for front aperture detection, the Curie temperature of the switching layer is usually 120°–200° C. If the temperature is above 200° C., the coercive force of the recording layer becomes 500 Oe or lower, and recording domains vanish due to the magnetic filed during reproduction. The temperature at which the magnetization aligns along an external field of 500 Oe in an erasing direction is about 120° C. according to the data on the switching filed $H_{sw}$ appearing in FIG. 13. Therefore, in a temperature range between 100° and 200° C., the exchange coupling force which exists between the readout layer and the recording layer decreases the inhibition force for inhibiting movement of domain wall of a recording domain in the magnetic layer, such that it is more preferable to set the compensation temperature $T_{comp}$ of the recording layer in the temperature range. However, a temperature range yielding a high coercive force around the compensation temperature $T_{comp}$ can be expanded by deposition conditions such as an argon gas pressure. In such a case, the compensation temperature can be set in a wider temperature range.

The magneto-optical disk of the embodiment explained above is used for front aperture detection. However, similar advantages can be obtained for a magneto-optical disk in rear aperture detection by providing a recording layer which has a compensation temperature between 0° and 100° C., because a recording domain in the recording layer remains as a half bubble from room temperature to a temperature where the recording domain is copied onto the readout layer, or more preferably from room temperature to 100° C. by taking into account stabilization of the recording domains at room temperature. Further, in a magneto-optical disk for double aperture detection, initialization is performed at room temperature, and it is effective to set the compensation temperature in a range between 0° and 110° C., similar to the range in rear aperture detection.

As explained above, the compensation temperature $T_{comp}$ of the recording layer is preferably 100°–200° C. for front aperture detection and preferably 0°–110° C. for rear or double aperture detection. In summary, if the compensation temperature is set in a range between 0° and 200° C., recording domains can be stabilized by either front, rear or double aperture detections.

Figure 22:
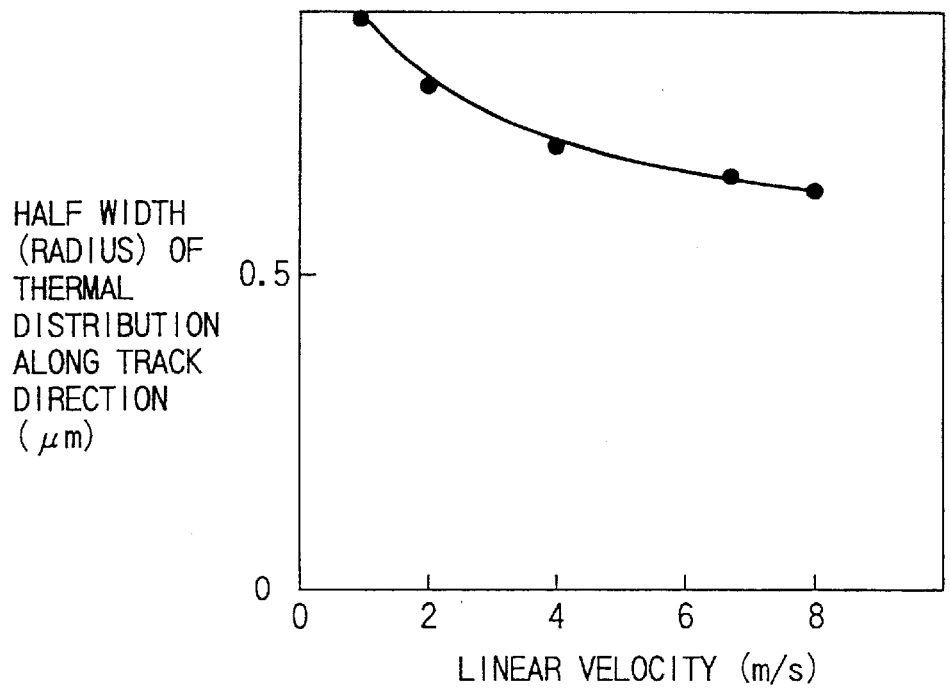
FIG. 22 is a graph of a half width of thermal distribution along a track direction plotted against the linear velocity as a result of a simulation on the magneto-optical disk having the structure shown in FIG. 1.

FIG. 22 shows the relation of a half width of thermal distribution along a track direction plotted against linear velocity as a result of simulation of the magneto-optical disk having the structure shown in FIG. 1. When the laser beam irradiates the disk, the heat diffuses along radial directions from the center of the beam. The half width represents positions where the temperature is equal to half of the highest temperature experienced at the center of the laser beam when the laser beam irradiates the disk continuously while reaching an equilibrium state. It is assumed that the laser beam has a Gaussian distribution. For example, if the peak temperature at the center of the laser beam is 200° C., the half width is obtained from positions having a temperature of 100° C. If the recording and erasing starts to begin at a temperature of 200° C., positions apart by 0.7 μm from the center of a laser beam reaches temperatures of 100° C. in the disk while the disk is rotating with a linear velocity of 6 m/s and while the laser beam is irradiating the disk to reach the temperature.

On the other hand, in a comparison example disk, recording is carried out along lands and grooves, and the track pitch is 0.8 μm.

The recording or erasing starts when the temperature at the center of the laser beam reaches a temperature such that the magnetic field for recording or erasing is equal to the coercive force of the recording layer. If the magnetic field is 300 Oe, the temperature is about 240° C. if TbFeCo having the characteristics shown in FIG. 2 is used. In this case, the temperature of about 120° C. is obtained at positions 0.7 μm apart from the center of the laser beam. In actual recording and erasing, a laser power of 1.5 times the power which can start the recording and erasing is used. Then, when a track is erased, the temperature of recording domains in an adjacent track in the recording layer is likely to rise and generate a half bubble. Then, the recording layer of the present invention is especially advantageous when the track pitch becomes short as in land and groove recording.

As explained above, by setting the compensation temperature of the recording layer which has a low Curie temperature at or around a temperature where the contraction force is smaller than the inhibition force, the coercive force of a recording domain can be kept at 20 kOe or higher at around the compensation temperature. Therefore, even the recording domain formed in the recording layer which has a low Curie temperature can be kept stable.

Figure 23:
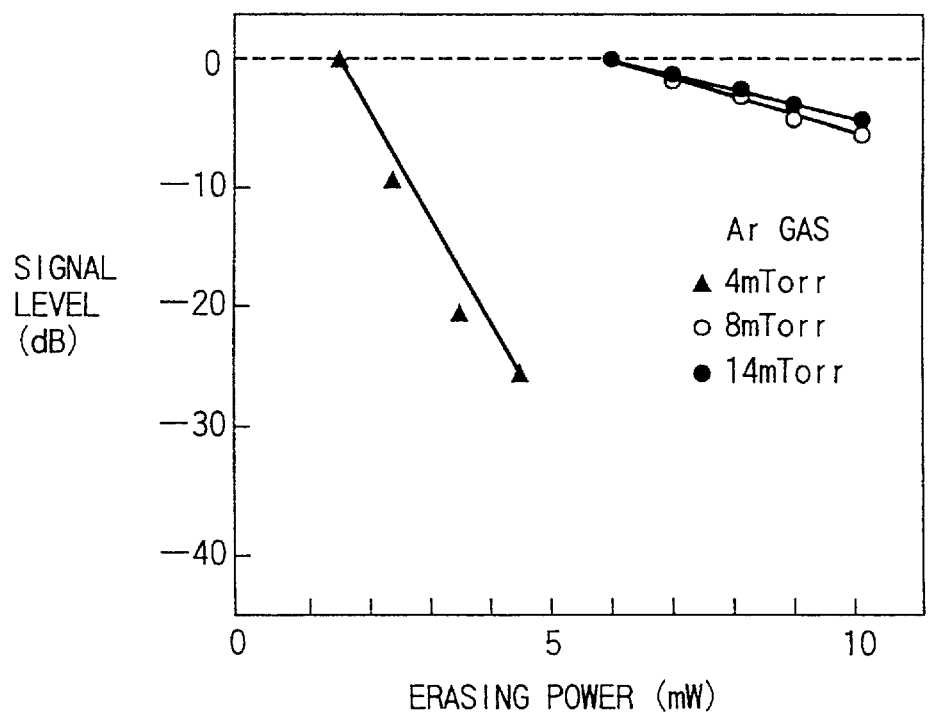
FIG. 23 is a graph of a difference of the output signals plotted against the erasing power of cross erasing test of a fourth embodiment of a disk.

A magneto-optical disk of a fourth embodiment of the present invention has the same structure shown in FIG. 1 except that a recording layer of TbFeCo has a compensation temperature of 20° C. Three examples are presented in which the recording layer of TbFeCo are prepared under 4, 8 and 14 mTorr of argon gas. FIG. 23 shows the relationship between the signal level against the erasing power during cross erasing of the disk. The recording and reproduction conditions are the same as in the counterparts of FIG. 6. The track pitch is set at 0.8 μm, and the recording domains are formed along lands and grooves of the track guide grooves.

The magneto-optical disks are prepared by deposition with direct current sputtering in argon gas. Discharge does not occur at or lower than 4 mTorr of argon gas (this is a lower pressure limit of the discharge of argon gas). On the other hand, if the gas pressure of argon is 14 mTorr or higher, the deposition rate decreases extremely because the number of argon atoms is large. Therefore, a practical gas range is between 4 and 14 mTorr. However, this range depends on the deposition apparatus.

Figure 24:
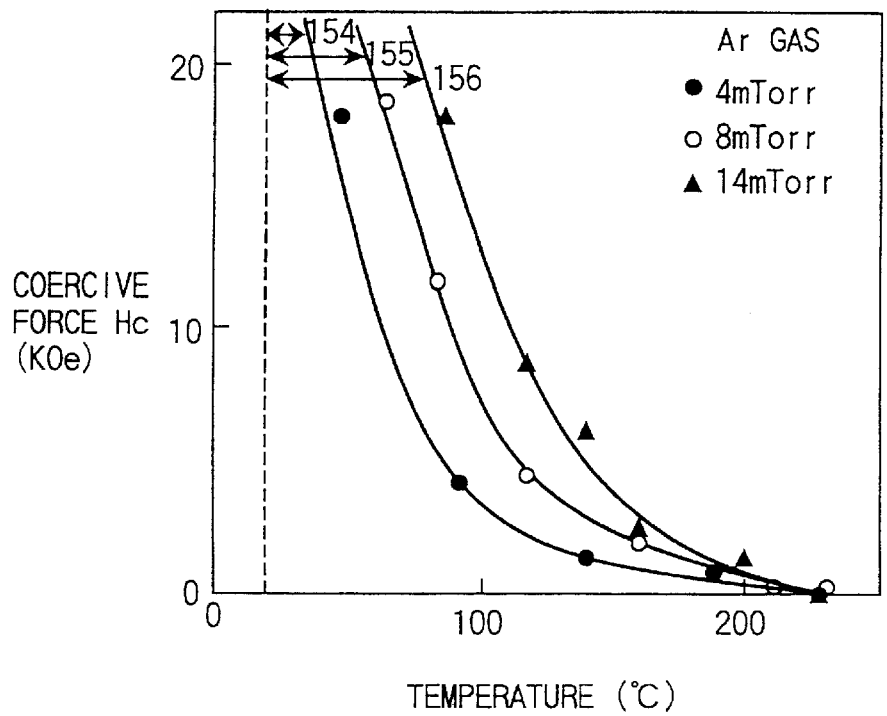
FIG. 24 is a graph of the temperature dependence of a coercive force of the recording layer of TbFeCo prepared at three argon gas pressures for compensation temperature of 20° C.

FIG. 24 shows the temperature dependence of the coercive force of the recording layers of TbFeCo which are prepared under argon gas pressures of 4, 8 and 14 mTorr. The Curie temperature of the recording layers is 230° C.

When the argon gas pressure is as low as 4 mTorr, the range 154 (FIG. 24) of a coercive force of 20 kOe or higher is as small as about 15° C., and the coercive force decreases rapidly with increasing temperature. Thus, the inhibition force for inhibiting movement of domain wall is small, and recording domains are likely to vanish easily. The composition control for controlling the compensation temperature is difficult to control. It is difficult to prepare a magneto-optical disk having a uniform cross erasing characteristic if TbFeCo is used because the coercive force decreases rapidly from a desired value when the compensation temperature deviates.

Figure 25:
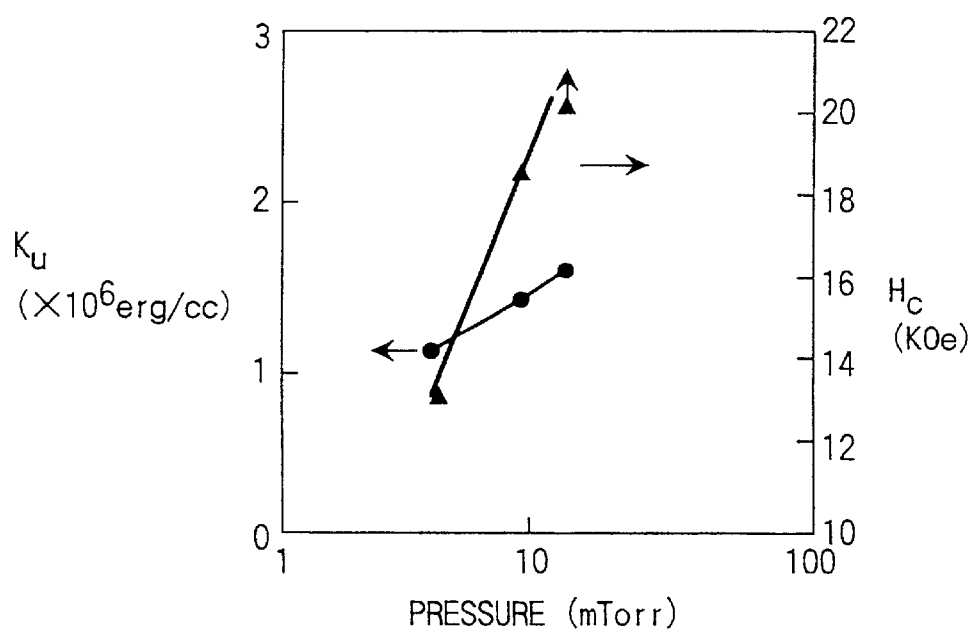
FIG. 25 is a graph of a vertical magnetic anisotropy constant and a coercive force plotted against pressure.

Then, argon gas pressure is preferably maintained at 8 mTorr or higher, or a range 155 of a coercive force of 20 kOe or higher is about 30° C. If argon gas pressure is as high as 14 mTorr, a range 156 of a coercive force of 20 kOe or higher is as large as about 40° C. of higher. This is attributed to a high vertical magnetic anisotropy $k_u$ of a film prepared with a high argon gas pressure. FIG. 25 shows the vertical magnetic anisotropy plotted against the argon gas pressure. This shows that decreases in cross erasing can be prevented for a compensation temperature of 20° C. if a range of the coercive force of 20 kOe or higher is at a temperature of about 30° C. or wider.

The coercive force can be expanded at 20 kOe or higher by preparing the layer in conditions where the argon gas pressure is increased as high as possible and the vertical magnetic anisotropy $K_u$ is increased. Thus, recording domains existing in the recording layer in an adjacent track are prevented from vanishing during cross erasing for a compensation temperature of 20° C.

The case for a compensation temperature of 20° C. is explained above. However, if the compensation temperature becomes higher than 20° C., the range for the high coercive force moves to higher temperatures, and the recording domains become more difficult to erase. Therefore, higher compensation temperatures are preferable.

Figure 26:
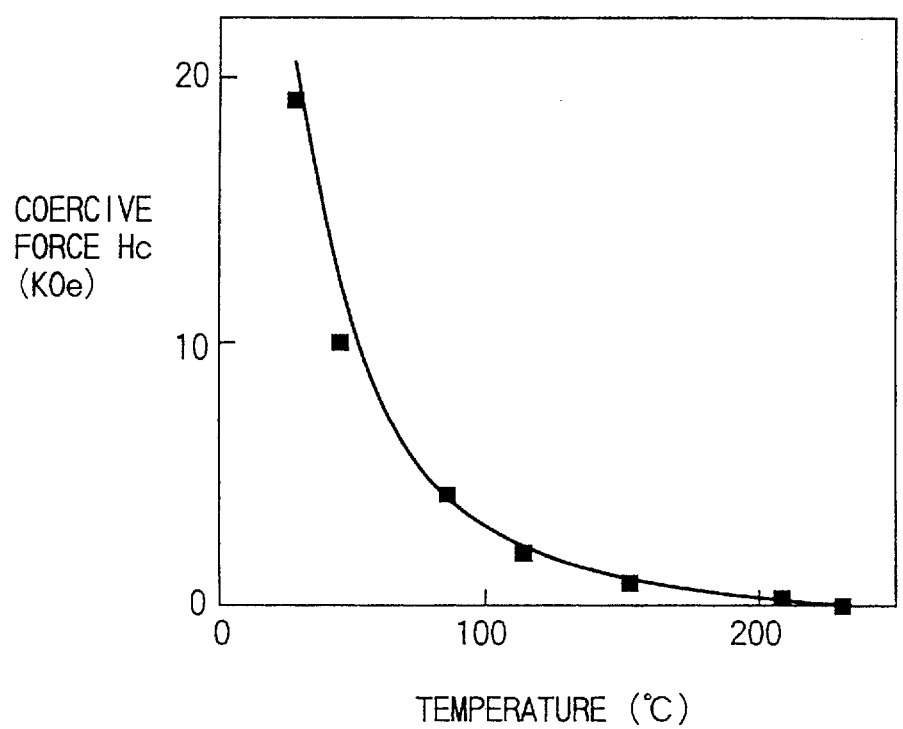
FIG. 26 is a graph of the temperature dependence of a coercive force of the recording layer of TbFeCo prepared at an argon gas pressure of 8 mTorr for a compensation temperature of 0° C.

FIG. 26 shows the temperature dependence of a coercive force of the recording layer of TbFeCo which is prepared at an argon gas pressure of 8 mTorr for a compensation temperature of 0° C. The Curie temperature is 230° C. The coercive force becomes about 2.5 kOe at a temperature of 120° C. Therefore, if the compensation temperature is 0° C., recording domains vanish during cross erasing because a force for inhibiting the removal of the domain walls is smaller than a contraction force.

The above-mentioned example is described for front aperture detection of the disk. However, similar advantages can be obtained for rear or double aperture detection for a magneto-optical disk which includes a recording layer, if a temperature range wherein a coercive force of the recording layer is 20 kOe or higher is higher by a temperature of 30° C. or more than the compensation temperature.

As explained above, the vertical magnetic anisotropy $K_u$ is controlled and a range of the coercive force of 20 kOe or higher is expanded. Then, the coercive force decreases more gradually with an increasing temperature. Therefore, recording domains are kept more stable.

Figure 27:
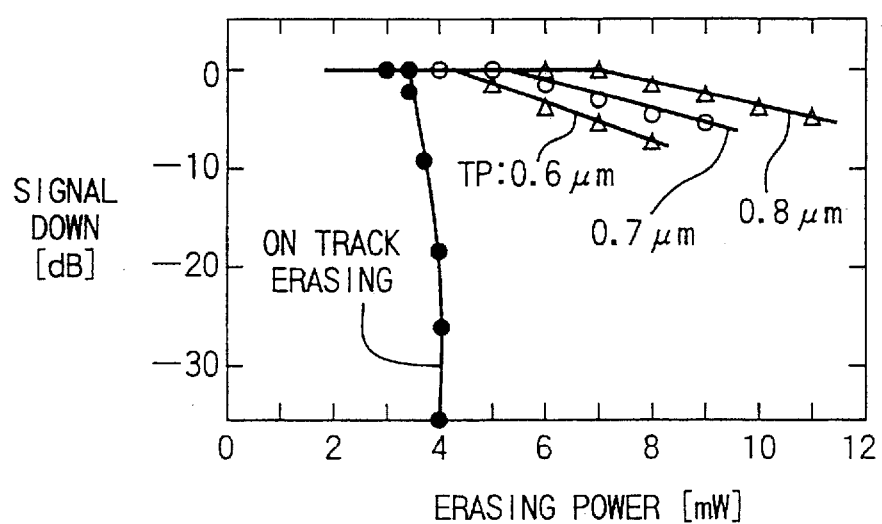
FIG. 27 is a graph showing the relation of cross erasing with an erasing power observed for magneto-optical disks with 0.6, 0.7 and 0.8 $\mu$m of track pitch of the fourth embodiment using TbFeCo having a Curie point of 230° C. and a compensation temperature of 20° C.

Next, cross erasing is examined for various track pitches with respect to erasing power. FIG. 27 shows a signal down characteristic plotted against an erasing power which is observed for magneto-optical disks of the fourth embodiment with 0.6, 0.7 and 0.8 $\mu$m of track pitch (TP), using TbFeCo, having a Curie point of 230° C., and a compensation temperature of 20° C. Recording is performed both along lands and grooves. Cross erasing is measured on adjacent tracks after the erasing of $10^4$ times. FIG. 27 also shows a signal level when the track itself is erased during track erasing.

An erasing power margin means the difference of an erasing power required for erasing the track completely and a power at which the signal level decreases by 1 dB. For a track pitch of 0.6 $\mu$m, the margin is about 1 mW. The erasing power margin is 4.5 mW±11% with a center at 4.5 mW. Thus, even for track pitch of 0.6 $\mu$m, recording domains are not erased at a low erasing power of 3–4 mW. On the other hand, the comparison example disk shown in FIG. 7, using TbFeCo having a Curie temperature of 230° C. as the recording layer, is erased by a low power of 3–4 mW.

The recording layer of TbFe Co used in the first embodiment is also effective for a track pitch of 0.6 $\mu$m. As previously explained, by increasing the Curie point of the recording layer of TbFeCo at a temperature 300° C. or higher, a decrease in the signal output at an adjacent track during cross erasing is as small as about 2 dB even if an erasing power of 9 mW is used.

Further, by increasing the argon gas pressure at 8 mTorr or higher (or by expanding a range of the coercive force of 20 kOe or higher by a temperature of 30° C. or higher), by expanding a range where the coercive force of the recording layer of 20 kOe or higher around compensation temperature, and by setting the compensation temperature at 0° C. or higher, an inhibition power for inhibiting movement of the domain wall enters a state where a recording domain becomes a half bubble. Then, a decrease in the signal output at an adjacent track during cross erasing is as small as about 2 dB even if an erasing power of 9 mW is used. Furthermore, erasing power margin is increased as large as ±11% for track pitch of 0.6 $\mu$m.

The above-mentioned example is described for front aperture detection of the disk. However, similar advantages can be obtained for rear or double aperture detection for a magneto-optical disk if the track pitch is between 1.6 and 0.6 $\mu$m.

Further, for front aperture detection of a magneto-optical disk with the magnetic layer of TbFeCo having a compensation temperature of 120° C., the coercive force of recording domains is kept at 20 kOe or higher in order to stabilize the recording domains at a temperature where an exchange coupling force decreases an inhibition force.

The embodiments discussed use vertical magnetization films as a readout layer. However, any film wherein the magnetization aligns within a plane may be used as a readout layer. In the film, the magnetization aligns in a plane at room temperature, while the magnetization aligns along a vertical direction during reproduction. Such a film has similar advantages as the vertical magnetization film.

Although the present invention has been fully described in connection with the preferred embodiments with reference to the accompanying drawings, it is to be noted that various changes and modifications are apparent to those skilled in the art. Such changes and modifications are to be understood as being included within the scope of the present invention.

What is claimed is:

1. A magneto-optical recording medium having a plurality of tracks, said medium comprising:

a substrate;

a recording layer made of a first magnetic material upon which recording domains are formed during data writing and data saving, the first magnetic material having an inhibition force, to inhibit movement of a domain wall of a recording domain formed along a track in said recording layer, which is larger than a contraction force of a half-bubble formed only in said recording layer when a track adjacent to the track containing the recording domain is heated during erasing or recording;

an intermediate layer made of a second magnetic material, the second magnetic material having a magnetization along said intermediate layer when said intermediate layer is separated from other magnetic materials; and a readout layer made of a third magnetic material upon which magnetic states of the recording domains are copied from said recording layer during data reproduction, the third magnetic material having a Curie point of at least 300° C. and a coercive force which is no greater than 1 kOe at room temperature, wherein a coercive force of said readout layer is smaller than that of said recording layer, and wherein said recording layer, said intermediate layer, and said readout layer are formed on said substrate such that said readout layer is formed at a side of said recording medium in which light is received during erasing and recording.

2. A recording medium according to claim 1, wherein said recording layer has a coercive force which is at least 20 kOe at a temperature range that is at least 30° C. greater than a compensation temperature of said recording layer.

3. A recording medium according to claim 1, wherein said recording layer has a coercive force which is at least 3 kOe at room temperature and the coercive force of said recording layer is no greater than 500 Oe when said recording layer is at a temperature between 200° and 250° C.

4. A recording medium according to claim 1, wherein the recording domains are formed on lands and on grooves of the plurality of tracks which are formed on said substrate.

5. A recording medium according to claim 1, wherein a pitch of the plurality of tracks is between 1.6 $\mu$m and 0.6 $\mu$m.

* * * * *